United States Patent [19]

Hüther

[11] 4,412,804
[45] Nov. 1, 1983

[54] APPARATUS FOR INJECTION MOLDING OF PRECISION PARTS

[75] Inventor: Werner Hüther, Karlsfeld, Fed. Rep. of Germany

[73] Assignee: MTU Motoren-Und Turbinen Union Munchen GmbH, Munich, Fed. Rep. of Germany

[21] Appl. No.: 318,282

[22] Filed: Nov. 4, 1981

[30] Foreign Application Priority Data

Nov. 7, 1980 [DE] Fed. Rep. of Germany ....... 3042052

[51] Int. Cl.³ .............................................. B29F 1/00
[52] U.S. Cl. ................................... 425/546; 425/155; 425/584; 264/102
[58] Field of Search ......................................... 425/155

[56] References Cited

U.S. PATENT DOCUMENTS

| | | | |
|---|---|---|---|
| 2,259,465 | 10/1941 | Hardy | 425/546 X |
| 3,433,291 | 4/1969 | Hodler | 425/546 X |
| 4,059,376 | 11/1977 | Ito et al. | 425/546 |
| 4,146,081 | 4/1979 | Reis | 425/546 X |

Primary Examiner—Thomas P. Pavelko
Attorney, Agent, or Firm—Alan H. Levine

[57] ABSTRACT

Apparatus including a material reservoir, a tool having a mold cavity, and a cylinder having a plunger for pushing material received by the cylinder from the reservoir into the mold cavity. Equipment is provided for evacuating the reservoir, the mold cavity, and the cylinder. The reservoir is connected to the cylinder in a vacuum-tight manner. The evacuating equipment includes a vacuum pump and a vacuum reservoir, and valves permit optional connection of the material reservoir and the mold cavity to the vacuum pump or the vacuum reservoir. The volume of the vacuum reservoir is many times, i.e., 100 to 1000 times, greater than that of the mold cavity. A shutoff valve for disconnecting the mold cavity from the evacuating equipment is located in the immediate vicinity of the mold cavity. All the valves may be operated in a predetermined sequence by a control unit. The material reservoir may serve simultaneously as the vacuum reservoir.

6 Claims, 5 Drawing Figures

APPARATUS FOR INJECTION MOLDING OF PRECISION PARTS

This invention relates to apparatus for injection molding of precision parts, and particularly such parts made of ceramic material. The apparatus includes a tool with a mold inside, and an injection cylinder preferably fitted with a screw plunger, a reservoir for the material to be injected being connected to the cylinder.

In the manufacture of molded items, the starting material used in injection molding is normally a granulate. Plastic granulate or ceramic compounds can absorb moisture from the air which, when the compound is being heated, produce inclusions in the form of vapor bubbles. In the molded article, these inclusions will be present in the form of discontinuities. Another cause of such voids in the molded item is that the compound will inevitably include some air which, when the compound is being compacted in the injection cylinder, cannot entirely be eliminated. This effect is encountered chiefly when the compounds being injected for molding are ceramic.

In order to eliminate these difficulties, degassing screw conveyors or plungers have been developed which include two compression zones. The injection cylinder is provided with a hole between these two zones permitting steam and air to escape after the compound has been compacted in the first zone, and before the compound is subjected to further processing. This method has been satisfactory where plain plastics are being processed. With ceramic compounds, however, the degree of degassing achieved in this matter is not sufficient since minute air bubbles (25 to 50 $\mu$m) considerably impair the strength of the components. Furthermore, the use of two compression zones involves a disadvantage in that the friction between the screw conveyor and the compound in the compression zone is extremely high. For this reason, a compound of superior flow properties is needed, which in the case of ceramic compounds can be achieved only by raising the binder or lubricant content. Raising the binder content, however, lowers the density of the ceramic material after the binder has been removed, but before sintering, which means that the final density of the sintered items, and thus their strength, will be compromised.

A further problem encumbering conventional processes is that when the mold is being filled, the compound necessarily displaces the air from the mold. Depending on the process parameters, this may involve two effects, namely, air can again be trapped in the compound, and at a high injection rate, the air in the mold is heavily compressed and heated sufficiently to burn the compound. In anticipation of these undesirable effects, the injection rate could be slowed down, allowing the air to escape through leaks in the tool, should these exist, or through specially incorporated de-aeration ducts with a valve closed by the compound. Both of these methods are ill-suited for processing ceramic compounds, however, since slow injection will impair the quality of the ceramic item and, where de-aeration ducts are being used, these invariably tend to be blocked before the mold is completely filled. In that event the amount of air being trapped is considerably reduced, but still appreciable. The strength of the ceramic material being rather sensitive to porosity, the strength of the finished item is thus compromised and caused to vary with the chance amount of air present.

It is a broad object of the present invention to provide an apparatus of the type described which safely eliminates the inclusion of air when air is being conveyed in the injection cylinder, and which enables the complete evacuation ($P < 10^{-1}$ Torr) of the mold to be achieved within an adequately short period of time.

It is a particular object of the present invention to provide an apparatus in which the tool, the injection cylinder, and the reservoir can be evacuated, and in which the reservoir is connected to the injection cylinder in a manner designed to preserve the vacuum.

The injection molding apparatus of the present invention is designed to make the cylinder assembly, together with the granulate reservoir, a vacuum vessel. In operation, the nozzle port of the cylinder is sealed by the compound ahead of the screw plunger. Sufficiently viscous compounds, such as those used in the manufacture of ceramic materials, will not be forced back into the cylinder by the air pressure. Although frequently used, a check-type valve will therefore no longer be required. The creation of a closed-circuit evacuating system in accordance with the present invention enables the apparatus of the present invention to achieve its purpose at relatively little complexity of design and accordingly at low manufacturing cost.

In order to generate and maintain the vacuum in the closed-circuit system it will be advantageous to connect the reservoir and the tool, through vacuum lines and valves, alternatively to a vacuum pump or a vacuum reservoir which relative to the volume of the mold has considerable volume. In the case of complex tools having two or three moving members (e.g., sliding tools for turbocharger or turbine wheels) it will be advantageous to accommodate these members in a common vacuum vessel which opens and closes together with the tool and which is also evacuated. The large-volume vacuum reservoir preferably has 100 to 1000 times the volume of the mold to safely prevent the pressure from unduly rising when the various partial areas are being evacuated.

According to a feature of the present invention, the vacuum line connected to the tool is closed or opened by means of a shutoff valve arranged in the immediate vicinity of the tool. This makes certain that the vacuum connection at the mold is sufficiently large to premit the final vacuum in the mold to be achieved in a matter of seconds, and that the vacuum line is protected from the ingress of compound being injected. In a preferred embodiment of the present invention, the shutoff valve is within a recess in the wall of the mold. This eliminates additional corners or projections on the casing, which otherwise would need removing.

According to another feature of the present invention, a control unit is provided to operate the shutoff valve and the valves in the vacuum lines in accordance with a certain schedule. This permits the various components to be evacuated successively, rather than concurrently, so that with a limited size of vacuum reservoir, a high vacuum can nevertheless be achieved.

In a preferred embodiment of the present invention, the material reservoir concomitantly serves as a vacuum reservoir. This arrangement affords a special advantage in terms of constructional simplicity.

According to a further feature of the present invention, the injection rate of the apparatus in accordance with the present invention is adapted to suit the size of mold such that the injection time is reduced to 0.5 second or less. This prevents the pressure in the mold from significantly rising as a result of unavoidable leakage during the injection time.

An illustrative embodiment of apparatus according to the present invention is described more fully below with reference to the accompanying drawings, in which.

Figure 1:
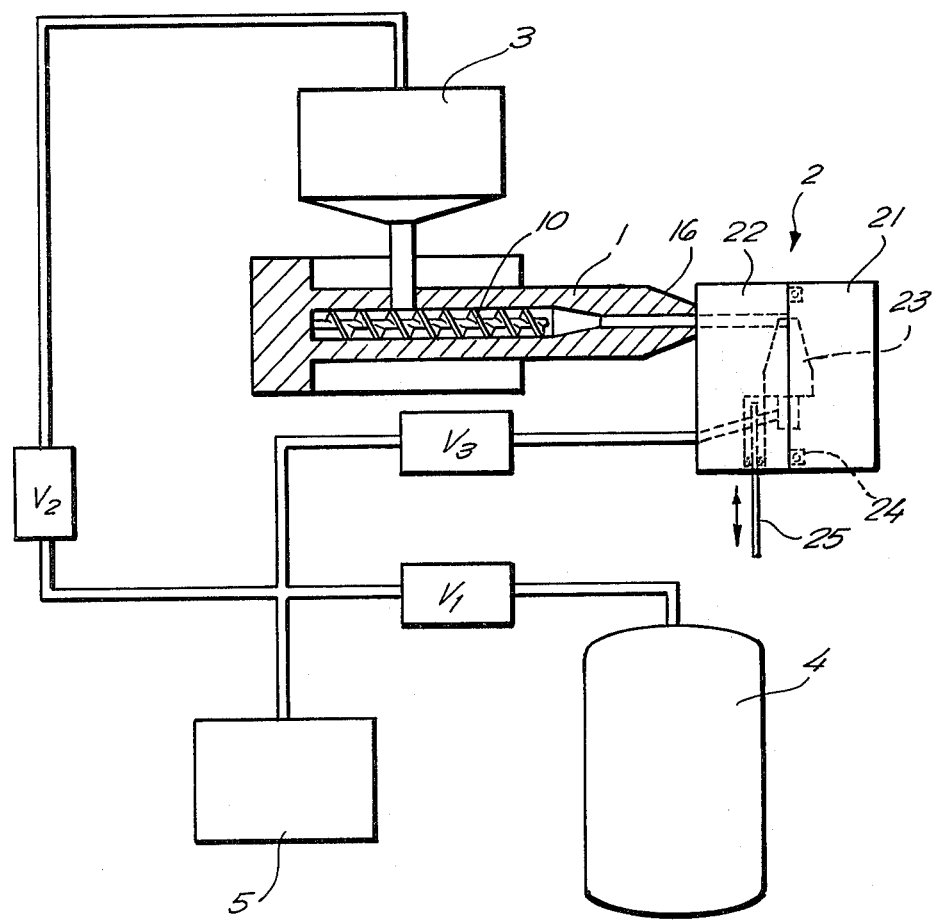
FIG. 1 is a schematic view illustrating an injection molding apparatus according to the present invention.

The injection molding apparatus shown in its entirety in FIG. 1 comprises an injection cylinder 1 having a screw plunger 10, a reservoir 3 which is connected to the injection cylinder and holds the material to be injected, and a tool 2 applied to which, with special sealing provisions, is the injection nozzle 16 of the injection cylinder 1. The tool 2 includes two halves 21 and 22 which abut each other along a parting plane to jointly form the mold cavity 23, which is formed with the negative contour of the casting to be produced. The mold 23 is sealed to exclude the environment by means of an O-ring 24 arranged at the parting plane. A vacuum line leads from each of the reservoir 3 and the tool 2 to a vacuum pump 5. A valve $V_2$ is installed in the vacuum line from the reservoir, and a valve $V_3$ in the vacuum line from the tool. Before they reach the vacuum pump 5 the two vacuum lines from the reservoir and the tool, respectively converge to form a single vacuum line, connected to which is a further vacuum line leading to a vacuum reservoir 4. The latter vacuum line incorporates a valve $V_1$. The vacuum line connected to the tool communicates with the mold 23 through a connecting duct which is closed or opened by means of a shutoff valve 25.

Figure 2:
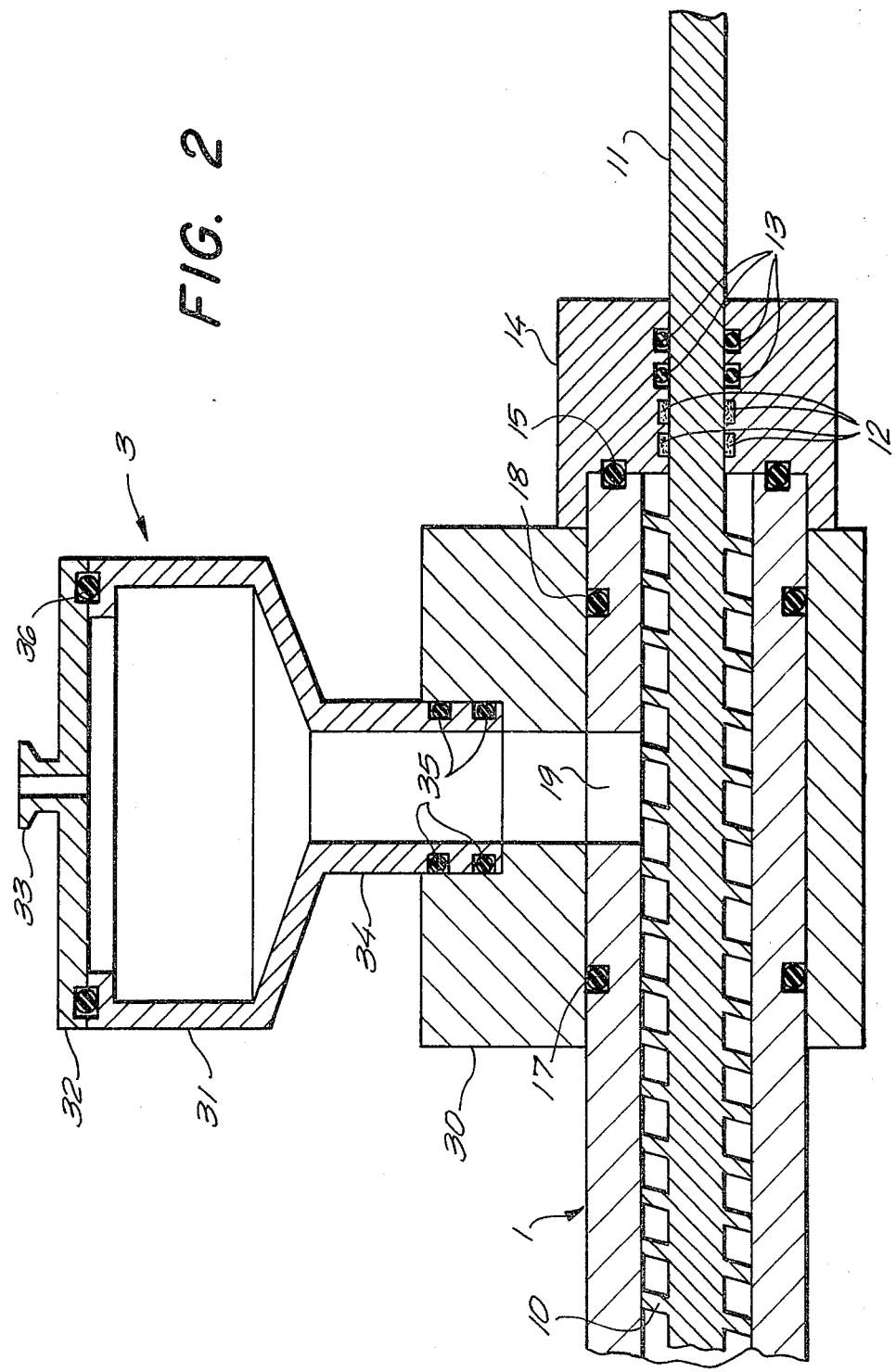
FIG. 2 is an enlarged fragmentary view of the apparatus of FIG. 1.

FIG. 2 illustrates the injection cylinder 1 and the reservoir 3 connected thereto with special provision made to preserve the vacuum. The connection is achieved by means of a mounting block 30 inserted into which are the injection cylinder 1, on the one hand, and the reservoir 3, on the other. The granulate reservoir 3 is accommodated by its connecting pipe 34 within a bore in the mounting block 30 and is sealed in this port by means of O-rings 35. Provided on a supply vessel 31 of the reservoir 3 is a cover 32 sealed by means of an O-ring 36 to preserve the vacuum. The cover 32 has a vacuum connector 33 for connection of the line leading to the vacuum pump 5. The injection cylinder 1 is sealed, relative to the mounting block 30, by means of O-rings 17 and 18 seated in slots arranged ahead and behind a port 19 which communicates with the granulate reservoir 3. The input shaft 11 of the screw plunger 10 has a vacuum-tight lead-in permitting rotary sliding motion and containing one or more felt rings 12 and one or more O-rings 13. The lead-in is contained inside an injection cylinder mounting nut 14. The mounting nut 14 proper is sealed relative to the body of the injection cylinder 1 by means of another O-ring 15.

Figure 3:
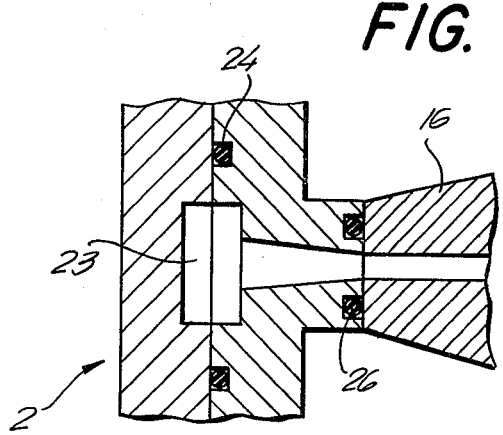
FIG. 3 is an enlarged view illustrating the injection nozzle of the apparatus of FIG. 1, in cooperation with one type of tool.
Figure 4:
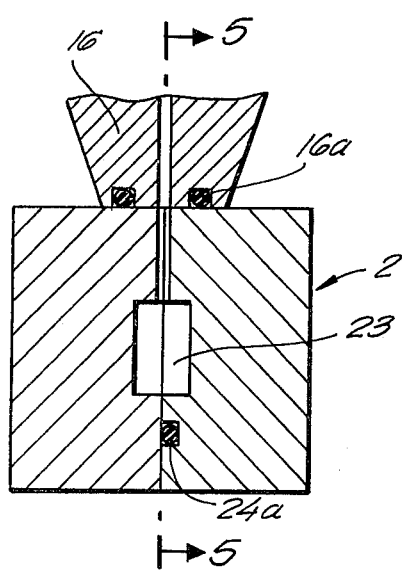
FIG. 4 is a cross-sectional view, at right angles to the plane of separation, illustrating a nozzle as shown in FIG. 3, but in cooperation with a different divided tool.
Figure 5:
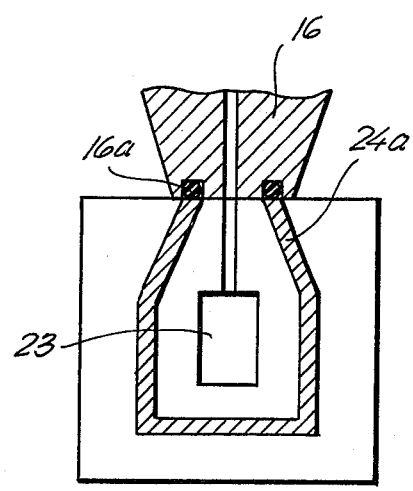
FIG. 5 is a cross-sectional view taken along line 5—5 of FIG. 4.

FIG. 3 illustrates the sealing provision for the nozzle 16 of the injection cylinder 1 relative to the tool 2 by means of an O-ring 26 arranged in the tool 2. This O-ring could alternatively be arranged in the nozzle 16 proper. Such an arrangement is shown in FIG. 4, where the O-ring concerned is indicated by the reference numeral 16a. In the configuration of FIG. 4, the O-ring 16a is seated in the nozzle 16 to permit injection into the parting plane of the tool 2. In this arrangement the O-ring 24a, used to seal the mold 23, is not a closed ring but terminates at either end at the O-ring 16a of the nozzle 16, as it apparent from FIG. 5.

The injection molding process can optionally be automatic, using a control unit omitted in the drawings, and follows the procedure detailed below. In the starting condition the valves $V_1$ and $V_2$ are open, valve $V_3$ is closed, tool 2 is open, and the shutoff valve 25 is closed. The process then proceeds as follows:

1. Close the tool 2;
2. Position the injection cylinder 1 into contact with the tool 2;
3. Close the valve $V_2$;
4. Open the shutoff valve 25 and open the valve $V_3$. The air in the mold 23 largely flows into the vacuum reservoir 4. The pressure in the reservoir 3 is prevented from rising at this time, valve $V_2$ being closed;
5. As soon as the pressures in the tool and in the reservoir 4 have equalized, valve $V_1$ is closed Valve $V_1$ can be controlled as a function of pressure or preferably as a function of time;
6. Start injecting;
7. Close the shutoff valve 25;
8. Close the valve $V_3$;
9. Open the valve $V_1$, causing the vacuum reservoir 4 to be fully evacuated by means of vacuum pump 5;
10. Open the valve $V_2$ as soon as the intended vacuum has been achieved;
11. Move the injection cylinder 1 away from the tool 2;
12. Open the tool 2.

The arrangement has now been restored to the starting condition.

The advantage afforded by this procedure is that the greater part of the air from the mold 3 flows into the vacuum reservoir 4 with a minimum of delay. After the vacuum reservoir 4 has been shut off by the valve $V_1$, only a small amount of air still remains in the tool 2 to be exhausted by the vacuum pump. Thereafter, when the valve $V_2$ has again opened, there will be sufficient time to again completely evacuate the vacuum reservoir 4.

As an alternative procedure the steps 6, 7, and 8 are performed concurrently. If the reservoir 3 assumes the function of the vacuum reservoir, the valve $V_1$ and the reservoir 4 can be omitted. Operation of the shutoff valve 25 is preferably hydraulic, while operation of the valve $V_1$, $V_2$ and $V_3$ is preferably electromagnetic.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:
1. Apparatus for injection molding of precision parts, comprising:
   a material reservoir for containing material to be injected, a tool having a mold cavity into which the material is injected to form the part, an injection cylinder for receiving material from the reservoir, an injection nozzle having a passageway therethrough between the injection cylinder and the mold cavity, a plunger within the cylinder for pushing material in the cylinder through the nozzle passageway into the mold cavity, evacuating means including a vacuum pump and a vacuum reservoir, the reservoir having a volume many times greater than that of the mold cavity, a vacuum line through which the mold cavity can communicate with both the vacuum pump and the vacuum reservoir, said vacuum line being independent of said nozzle passageway, and control valve means for selectively connecting the mold cavity to and disconnecting the mold cavity from the vacuum reservoir and for connecting the mold cavity to the vacuum pump even when the mold cavity is disconnected from the vacuum reservoir.

2. Apparatus as defined in claim 1 wherein the volume of the vacuum reservoir is 100 to 1000 times greater than that of the mold cavity.

3. Apparatus as defined in claim 1 including a shutoff valve for interrupting the connection of the mold cavity to the evacuating means, the valve being located in the immediate vicinity of the mold cavity.

4. Apparatus as defined in claim 3 wherein the shutoff valve is located within a recess in the tool.

5. Apparatus as defined in claim 3 including vacuum control valves between the evacuating means and each of the material reservoir and the tool, a vacuum control valve between the vacuum pump and the vacuum reservoir, and a control unit for operating the shutoff valve and the vacuum control valves in a predetermined sequence.

6. Apparatus as defined in claim 5 wherein the control unit is adjusted such that during evacuation of the mold the vacuum control valve between the vacuum pump and the vacuum reservoir is closed immediately after the pressures in the mold and in the reservoir have equalized.

* * * * *